Sept. 14, 1965   E. WIEGER   3,205,694
CUTTING AND PRESSING APPARATUS
Filed March 8, 1962   3 Sheets-Sheet 2

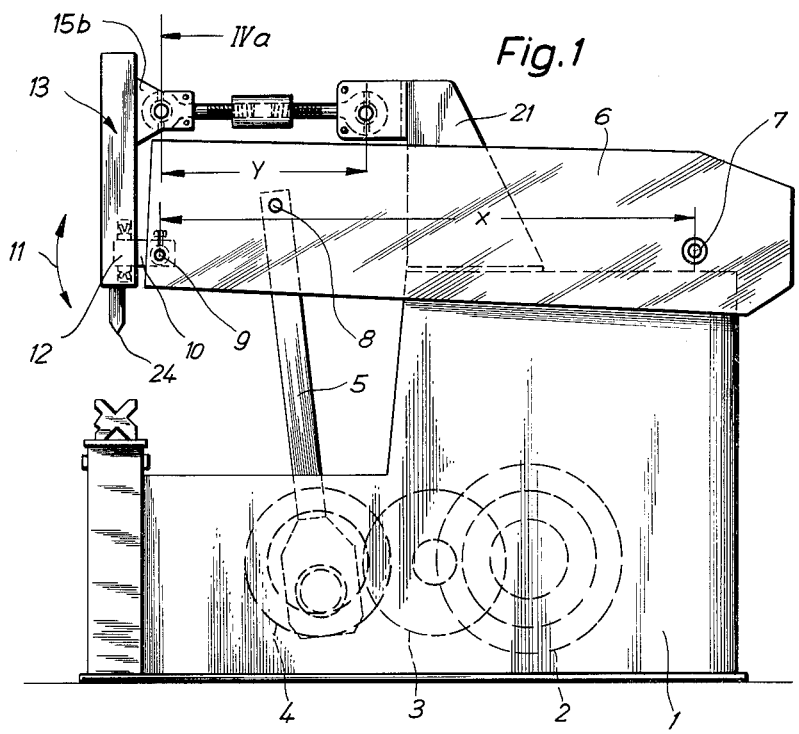
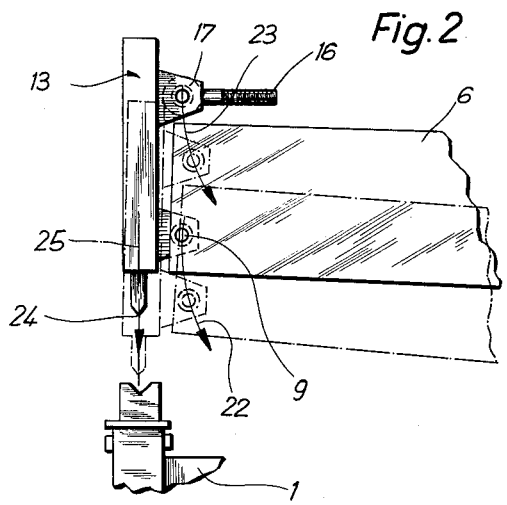

Sept. 14, 1965  E. WIEGER  3,205,694
CUTTING AND PRESSING APPARATUS
Filed March 8, 1962  3 Sheets-Sheet 3

United States Patent Office 3,205,694
Patented Sept. 14, 1965

3,205,694
CUTTING AND PRESSING APPARATUS
Ernst Wieger, Budericher Str. 13, Neuss (Rhine), Germany
Filed Mar. 8, 1962, Ser. No. 178,508
Claims priority, application Germany, Mar. 9, 1961,
W 29,624
8 Claims. (Cl. 72—450)

The present invention relates to a cutting and pressing apparatus. Device of this type are known comprising a frame having linked thereto an upper arm with a tool carrier. This type of cutting and pressing device avoids the drawback of those apparatuses in which the upper tool carrier moves in rails which have to be adjustable in order to properly adjust the tool carrier. In view of the free movement on a cylindrical track when employing an upper arm with tool carrier linked to a frame, the tool carrier will be prevented from being strongly pressed against the guiding rail tracks as is the case with tool carriers guided in vertical planes.

With the heretofore known devices, the upper arms linked to a frame and supporting tool carriers are able to carry out an almost straight movement of the tool carrier when a sufficient spacing is provided between the pivot point of the upper arm and the tool carrier. Also by means of the well known parallelogram guide of the upper arm with tool carrier a movement of the upper arm on a cylindrical surface with large radius can be obtained while the upper arm is linked to two parallel tilting arms.

In particular, with plate shears, it is of importance that the lower edge of the tool is guided on a vertical plane. Furthermore, during pressing bending operations, it is advantageous to have the tool carry out a vertical movement. Such vertical movement has heretofore been possible only with devices which operate with an eccentric and in which the tool moves in sliding rails.

It is, therefore, an object of the present invention to provide a pressing and cutting device in which the tool with its effective portion is movable in a vertical plane while maintaining the advantages of those devices in which the upper arm is tiltably linked to a frame.

It is also an object of this invention to provide a pressing and cutting device as set forth in the preceding paragraph, in which the lower knife edge of the cutting device will move precisely in a vertical plane.

These and other objects and advantages of the invention will appear more clearly from the following specification in connection with the accompanying drawings, in which:

FIG. 1 illustrates a side view of an apparatus according to the present invention.

FIG. 2 illustrates the movement of the tool carrier and the tool.

Figure 1A:
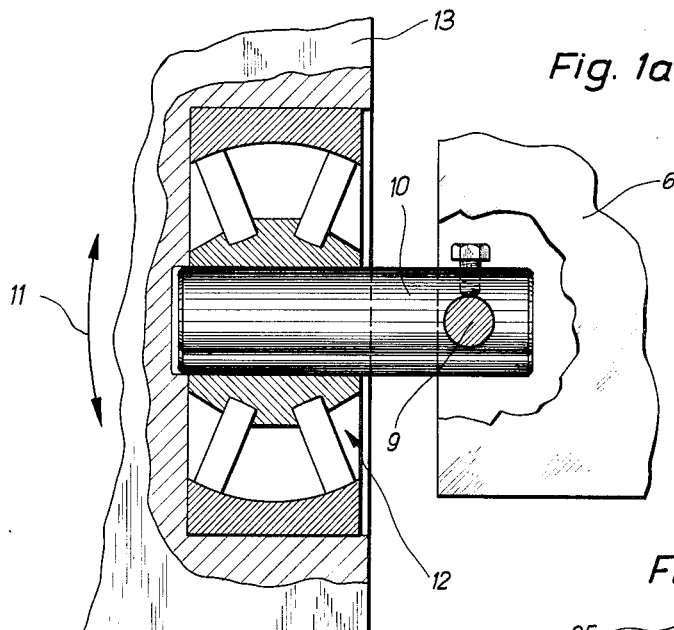
FIGS. 1a, 2a and 4a show details of the corresponding FIGS. 1, 2, and 4.
Figure 2A:
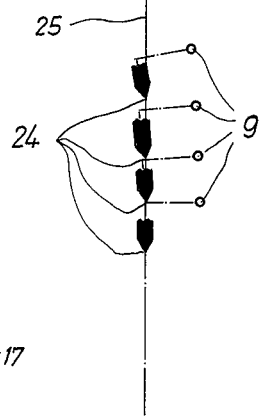
Figure 4A:
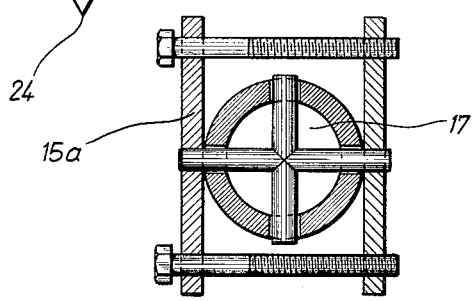

The present invention is based on a cutting and pressing device with an upper arm tiltably linked to a frame and supporting a tool carrier. The above mentioned objects of the present invention have been realized by tiltably connecting the tool carrier near its lower edge to said upper arm and near its upper edge through the intervention of intermediate members with a stationary machine part.

According to a further feature of the invention, the distance between the lower pivot point of the tool carrier and the pivot point of the upper arm is considerably greater than the length of the intermediate members and the distance between the upper and lower pivot points at which the tool carrier is linked to the upper arm and intermediate members respectively. In order to obtain the desired straight path of the effective part of the tool, the intermediate members are adjustable as to their length.

It is of particular advantage to have the crank arm for moving the upper arm engage said upper arm near the lower pivot point of the tool carrier. Such an arrangement makes it possible to design the upper arm so strong only as it is required for the movement of the tool carrier. A high horizontal or vertical force is not exerted upon the upper arm and, in particular, no bending forces are exerted upon the upper arm. The crank arm will be best connected to the upper arm at a distance of approximately ¾ of the length of the upper arm from the pivot point of this arm.

According to a particularly advantageous feature of the present invention, the tool carrier is rotatable relative to the upper arm in such a way that the cutting and pressing edge of the tool will, in an inclined position with regard to the horizontal plane, carry out its pressing or cutting operation. Thus, in particular, a cut can be carried out during which the cutting edge is located horizontally, and a drawing cut can be performed while the cutting edge is inclined to the horizontal plane. For inclining the effective edge of the tool, the tool carrier is at its pivot point connected to the upper arm by means rotatable in two planes. Furthermore, each intermediate member is connected to the upper pivot point of the tool carrier and to the stationary machine part by one connection each effective in two planes.

Referring now to the drawings in detail, the arrangement shown therein comprises a bed or frame 1 housing driving elements 2, 3 and 4. The driving element 4 comprises the crank arms 5. The free ends of crank arms 5 engage the upper arm 6 which is tiltably supported at 7. The point of connection 8 of the crank arms 5 to the upper arm 6 is located near one pivot point 9 each about which a stud 10 is tiltable in the direction of the arrow 11. The front end of stud 10 carries at 12 a swivel joint which may be designed for instance as pendulum feeder. The stud 10 is connected through said pendulum feeder to the tool carrier 13. The said tool carrier 13 is provided with two double supports 15a, 15b each (FIG. 4) which together with the intermediate members 16 form a joint 17 which is effective in two planes so that the intermediate members 16 are able with regard to the double supports 15a, 15b to occupy a tilted and also an inclined position.

The intermediate members 16 are composed of two sections and are adjustable relative to each other by a threaded sleeve 18 for adjusting the length of the composite intermediate members.

The second end of each intermediate member is rotatable and tiltable through the intervention of joint 19 which is effective in two planes and is supported by a yoke 20. Each intermediate member is by means of yoke 20 connected to an extension 21 of frame 1. When the upper arm 6 is tilted about pivot 7, the pivot point 9 of the tool carrier 13 carries out a circular movement indicated by the arrow 22. The upper pivot point of the tool carrier at the level of joint 17, however, carries out a movement along the arc 23. The two movements produce a resultant movement of the bending tool tip 24 which is located on a straight line 25. Thus, regardless of how far the upper arm and thus the tool carrier 13 is moved within the possible tilting range of the upper arm, the points at which the tip 24 of the tool will be effective will always be located on the line 25.

Of particular importance in this connection is the ratio of the distances between the individual pivot points.

The distance X between the pivot 7 and the pivot 9 of the tool carrier on the upper arm is, as will be evident from the drawings, considerably greater than the distance Y between the upper pivot of the tool carrier at the level of the joint 17 and the joint 19, i.e. the length of the intermediate member 16. Also the distance X is considerably greater than the distance between the lower pivot 9 of the tool carrier and the upper pivot of the same part on the intermediate member 16.

Figure 3:
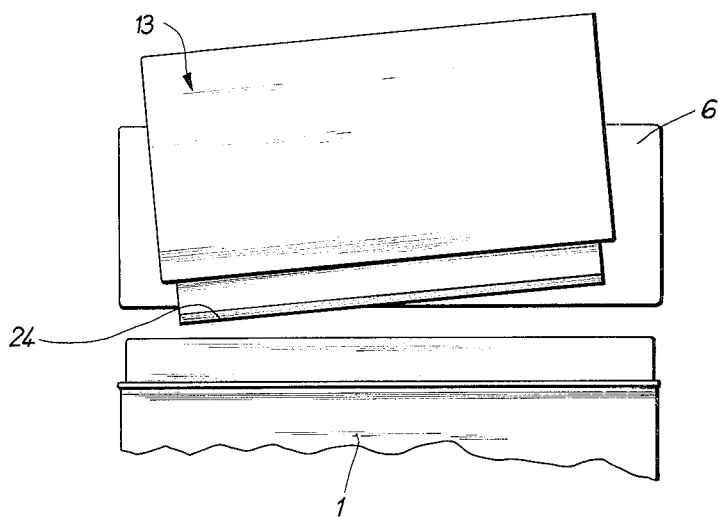
FIG. 3 shows the upper arm with tool carrier in a position inclined with regard to the horizontal plane.
Figure 4:
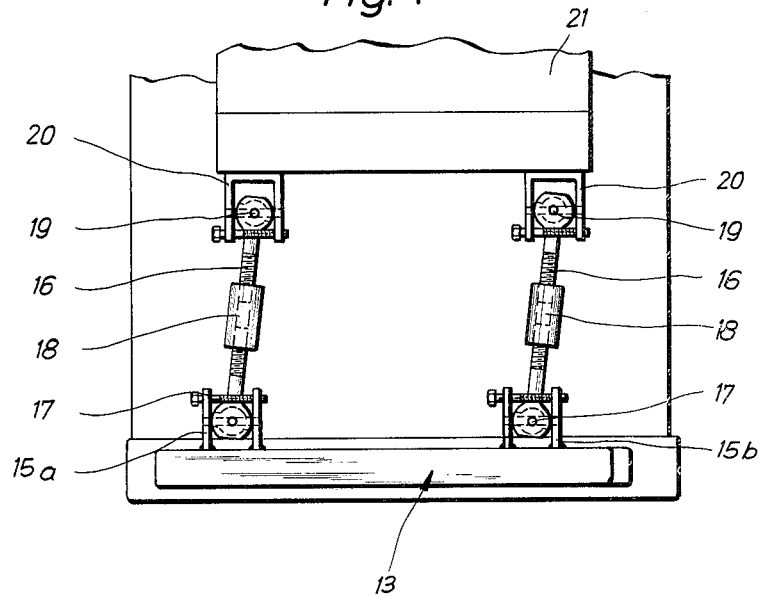
FIG. 4 shows the intermediate members in an inclined position, as seen in the direction of the arrow "A" of FIG. 1.

When correspondingly adjusting joints 9 and 17 which can be arrested, the tool carrier 13 may be inclined as is illustrated in FIG. 3 in a somewhat exaggerated manner. The pendulum feeders 12 are in this connection adjusted in the same manner as the joints 17 and 19 effective in two planes. With such inclined position of the tool carrier, due to the movability of the joints, it will be possible so to incline the intermediate members relative to the horizontal plane as is shown in FIG. 4.

It is, of course, to be understood that the present invention is, by no means, limited to the particular construction shown in the drawing but also comprises any modifications within the scope of the appended claims.

What I claim is:

1. An apparatus adapted for cutting and pressing operations, which comprises: a frame including a stationary support member for supporting a first stationary tool, an arm pivotally connected to said frame, a carrier having an upper edge portion and a lower edge portion and adapted for supporting a second moveable tool, said tool carrier extending in a direction substantially at right angles to said arm and being pivotally connected near the lower edge portion thereof to said arm, said tool carrier furthermore being substantially coplanar with said support member and having its said lower end portion nearest said support member, a link substantially shorter in effective length than the effective length of said arm and substantially parallel thereto having one end portion pivotally connected to said frame and having its other end portion pivotally connected to said tool carrier near the upper edge portion thereof, and means for moving said arm about its pivotal connection with said frame to move said tool carrier toward and away from said support member, said arm and link providing for controlled movement of said tool carrier in two planes to maintain a predetermined relation between tools in said tool carrier and on said support member.

2. An apparatus adapted for cutting and pressing operations, which comprises: a frame including a stationary support member for supporting a first stationary tool, an arm pivotally connected to said frame, a carrier having an upper edge portion and a lower edge portion and adapted for supporting a second moveable tool, said tool carrier extending in a direction substantially at right angles to said arm and being pivotally connected near the lower edge portion thereof to said arm, said tool carrier furthermore being substantially coplanar with said support member and having its said lower end portion nearest said support member, a link substantially shorter in effective length than the effective length of said arm and substantially parallel thereto having one end portion pivotally connected to said frame and having its other end portion pivotally connected to said tool carrier near the upper edge portion thereof, and means for moving said arm about its pivotal connection with said frame to move said tool carrier toward and away from said support member, said arm and link providing for controlled movement of said tool carrier in two planes to maintain a predetermined relation between tools in said tool carrier and on said support member, the distance between the pivotal connection of the tool carrier near the lower edge portion thereof with said arm and the pivotal connection of said arm with said frame being considerably greater than the effective length of said link and also substantially greater than the distance between the pivotal connections of said tool carrier with said arm and said link respectively.

3. An apparatus adapted for cutting and pressing operations, which comprises: a frame including a stationary support member for supporting a first stationary tool, an arm pivotally connected to said frame, a carrier having an upper edge portion and a lower edge portion and adapted for supporting a second moveable tool, said tool carrier extending in a direction substantially at right angles to said arm and being pivotally connected near the lower edge portion thereof to said arm, said tool carrier furthermore being substantially coplanar with said support member and having its said lower end portion nearest said support member, a link substantially shorter in effective length than the effective length of said arm and substantially parallel thereto having one end portion pivotally connected to said frame and having its other end portion pivotally connected to said tool carrier near the upper edge portion thereof, and means for moving said arm about its pivotal connection with said frame to move said tool carrier toward and away from said support member, said arm and link providing for controlled movement of said tool carrier in two planes to maintain a predetermined relation between tools in said tool carrier and on said support member, the distance between the pivotal connection of the tool carrier near the lower edge portion thereof with said arm and the pivotal connection of said arm with said frame being considerably greater than the effective length of said link and also substantially greater than the distance between the pivotal connections of said tool carrier with said arm and said link respectively, said means for moving said arm comprising crank means carried by said frame and a connecting rod leading from said crank means to said arm and connected to said arm near the pivotal connection of said tool carrier with said arm.

4. An apparatus adapted for cutting and pressing operations, which comprises: a frame including a stationary support member for supporting a first stationary tool, an arm pivotally connected to said frame, a carrier having an upper edge portion and a lower edge portion and adapted for supporting a second moveable tool, said tool carrier extending in a direction substantially at right angles to said arm and being pivotally connected near the lower edge portion thereof to said arm, said tool carrier furthermore being substantially coplanar with said support member and having its said lower end portion nearest said support member, a link substantially shorter in effective length than the effective length of said arm and substantially parallel thereto having one end portion pivotally connected to said frame and having its other end portion pivotally connected to said tool carrier near the upper edge portion thereof, and means for moving said arm about its pivotal connection with said frame to move said tool carrier toward and away from said support member, said arm and link providing for controlled movement of said tool carrier in two planes to maintain a predetermined relation between tools in said tool carrier and on said support member, the distance between the pivotal connection of the tool carrier near the lower edge portion thereof with said arm and the pivotal connection of said arm with said frame being considerably greater than the effective length of said link and also substantially greater than the distance between the pivotal connections of said tool carrier with said arm and said link respectively, the pivotal connection between said link and said tool carrier comprising a swivel joint operable to permit movement of said tool carrier in two planes.

5. An apparatus adapted for cutting and pressing operations, which comprises: a frame including a stationary support member for supporting a first stationary tool, an arm pivotally connected to said frame, a carrier having an upper edge portion and a lower edge portion and adapted for supporting a second moveable tool, said tool carrier extending in a direction substantially at right angles to said arm and being pivotally connected near the lower edge portion thereof to said arm, said tool carrier furthermore being substantially coplanar with said support member and having its said lower end portion nearest said support member, a link substantially shorter in effective length than the effective length of said arm and substantially parallel thereto having one end portion pivotally connected to said frame and having its other end portion pivotally connected to said tool carrier near the upper edge portion thereof, and means for moving said arm about its pivotal connection with said frame to move said tool carrier toward and away from said support member, said arm and link providing for controlled movement of said carrier in two planes to maintain a predetermined relation between tools in said tool carrier and on said support member, the distance between the pivotal connection of the tool carrier near the lower edge portion thereof with said arm and the pivotal connection of said arm with said frame being considerably greater than the effective length of said link and also substantially greater than the distance between the pivotal connections of said tool carrier with said arm and said link respectively, the pivotal connection between said link and said tool carrier comprising, a swivel joint operable to permit movement of said tool carrier in two planes, the pivotal connection of said link with said stationary member also including a swivel joint operable to permit movement of said link in two planes.

6. An apparatus according to claim 5 which includes means for locking the said swivel joints in any predetermined adjusted position.

7. An apparatus adapted for cutting and pressing operations, which comprises: a frame including a stationary support member adapted for supporting a first stationary tool, an arm pivotally connected at one end to said frame and having its other end adjacent said support means, a tool carrier substantially coplanar with said support member and adapted for carrying a second moveable tool on the end thereof which is nearest said support member, means pivotally connecting the end of said tool carrier which is nearest said support member with the said other end of said arm, said means comprising a swivel joint providing for movement of said tool carrier in two planes relative to said arm, and a pair of links substantially shorter than the effective length of said arm and extending substantially parallel to said arm, means at one end of said links pivotally connecting said links to said frame, means at the other end of said links pivotally connecting said links with the end of said tool carrier which is remote from said stationary support member, the said means at both ends of said links comprising swivel joints operable to permit movement of said links in two planes relative to said frame and to said tool carrier.

8. An apparatus according to claim 7 in which the said swivel joints at the ends of said links include means for locking the swivel joints in adjusted positions with respect to one of the planes of movement provided thereby.

References Cited by the Examiner

UNITED STATES PATENTS

| | | | |
|---|---|---|---|
| 49,018 | 7/65 | Wells et al. | 83—644 |
| 268,440 | 12/82 | Trowbridge | 83—602 |
| 792,786 | 6/05 | Pitkin | 100—282 |
| 827,956 | 8/06 | Bradley | 100—282 |
| 2,420,923 | 5/47 | West | 100—282 |
| 2,491,363 | 12/49 | Dehn | 83—610 |
| 3,026,755 | 3/62 | Castle | 83—639 |

CHARLES W. LANHAM, *Primary Examiner.*

CARL W. TOULIN, *Examiner.*